United States Patent
Hsu et al.

(10) Patent No.: US 6,876,557 B2
(45) Date of Patent: Apr. 5, 2005

(54) UNIFIED SRAM CACHE SYSTEM FOR AN EMBEDDED DRAM SYSTEM HAVING A MICRO-CELL ARCHITECTURE

(75) Inventors: Louis L. Hsu, Fishkill, NY (US); Rajiv V. Joshi, Yorktown Heights, NY (US)

(73) Assignee: IBM Corporation, Armonk, NY (US)

( * ) Notice: Subject to any disclaimer, the term of this patent is extended or adjusted under 35 U.S.C. 154(b) by 507 days.

(21) Appl. No.: 09/879,653

(22) Filed: Jun. 12, 2001

(65) Prior Publication Data

US 2002/0188797 A1 Dec. 12, 2002

(51) Int. Cl.[7] .............................................. G11C 15/00
(52) U.S. Cl. .................. 365/49; 365/189.07; 365/225.7
(58) Field of Search ................................ 365/49, 225.7, 365/189.07, 200, 207

(56) References Cited

U.S. PATENT DOCUMENTS 5,226,009 A * 7/1993 Arimoto ................ 365/189.04
5,509,132 A * 4/1996 Matsuda et al. ................ 711/3
6,510,492 B2 * 1/2003 Hsu et al. .................... 711/122

* cited by examiner

Primary Examiner—Son T. Dinh
(74) Attorney, Agent, or Firm—Dilworth & Barrese, LLP

(57) ABSTRACT

A unified SRAM cache system is provided incorporated several SRAM macros of an embedded DRAM (eDRAM) system and their functions. Each incorporated SRAM macro can be independently accessed without interfering with the other incorporated SRAM macros within the unified SRAM cache system. The incorporated SRAM macros share a single set of support circuits, such as row decoders, bank decoders, sense amplifiers, wordline drivers, bank pre-decoders, row pre-decoders, I/O drivers, multiplexer switch circuits, and data buses, without compromising the performance of the eDRAM system.

42 Claims, 6 Drawing Sheets

UNIFIED SRAM CACHE SYSTEM FOR AN EMBEDDED DRAM SYSTEM HAVING A MICRO-CELL ARCHITECTURE

FIELD OF THE INVENTION

This invention relates to the field of integrated circuit (IC) design. Specifically, it relates to a unified SRAM cache system for an embedded DRAM (eDRAM) system having a micro-cell architecture, a wide data bandwidth and a wide internal bus width.

BACKGROUND OF THE INVENTION

Embedded DRAMs (eDRAMs) with wide data bandwidth and wide internal bus width have been proposed to be used as L2 (level-2) cache to replace pure SRAM cache. Since each DRAM memory cell is formed by a transistor and a capacitor, the size of DRAM cache is significantly smaller than that of SRAM cache. In order to meet performance requirements, DRAMs are made of a plurality of blocks or micro-cells. A block is a small DRAM array unit formed by a plurality of wordlines (e.g., from 64 to 256) and a plurality of bitline pairs (e.g., from 64 to 256). The size of a block is much smaller (e.g., 16× to 256×) than that of a bank of a conventional stand-alone DRAM. Only one block of the eDRAMs is activated each time. The read and write speed of an eDRAM can be fast due to very light loading of wordlines and bitlines.

In order to effectively utilize the large DRAM cache size, many SRAM macros are required to facilitate a high-speed pipeline operation in an eDRAM system. A first SRAM macro is required as a cache interface to be placed between the mass eDRAM arrays and the processor(s). The first SRAM macro is about the same size of an eDRAM block. Hence, area penalty is minimal.

The wide internal bus is used for facilitating a high data transfer rate among eDRAM, SRAM, and the processor(s). More specifically, data residing in eDRAM memory cells coupled to a wordline traversing an eDRAM block is transferred to primary sense amplifiers. The data is then transferred to corresponding secondary sense amplifiers. The data is then transferred to the first SRAM macro, i.e., the SRAM cache, and stored in the memory cells thereof at the same wordline location.

A second SRAM macro, called TAG block cache, is used to record the addresses of those micro-cells whose data are temporarily stored within the SRAM cache. The data is then transferred to the processor(s). When an incoming address is issued, the TAG block cache is examined to determine whether it is a hit or a miss. A hit means data are currently stored in the SRAM cache and can be retrieved immediately. A miss, on the other hand, means data must be retrieved from the DRAM.

A third SRAM macro is used to record redundancy information, including failed row and column addresses of the DRAM arrays. Therefore, whenever accessing a DRAM array, the redundancy information is provided so that the defective row and/or column is replaced with the good redundant elements.

A fourth SRAM macro can be used for BIST operation. For example, the addresses of defective column or row elements must be temporarily recorded during a test mode. At the end of the test mode, when the redundancy algorithm is satisfied, the recorded addresses are used to program the fuses.

Finally, another SRAM macro may be required to store a portion of a test program for executing the test mode. Generally, there are two sets of test programs. The first set of programs are those fixed programs used to test the memory. This set is typically stored in a ROM. The second set of programs are those programmable programs used to test customized memory, or to provide test flexibility. This set is stored in SROM (scannable ROM). Similar to a fuse register array, the SROM is not an area efficiency design. The SROM can be replaced with an SRAM macro.

An eDRAM system having several small SRAM macros is not area efficient. Since each small SRAM macro contains about a 50% area for support circuits, e.g., sense amplifiers, decoders and drivers. Accordingly, a need exists for a unified SRAM cache system incorporating the several SRAM macros of an eDRAM system and their functions, so that each incorporated SRAM macro can be independently accessed without interfering with the other incorporated SRAM macros within the unified SRAM cache system. A need also exists for a unified SRAM cache system, as described in the previous sentence, where the incorporated SRAM macros share a single set of support circuits without compromising the performance of the eDRAM system.

SUMMARY

An aspect of the present invention is to provide a unified SRAM cache system incorporating several SRAM macros of an embedded DRAM (eDRAM) system and their functions, so that each incorporated SRAM macro can be independently accessed without interfering with the other incorporated SRAM macros within the unified SRAM cache system. The eDRAM system includes a micro-cell architecture, a wide data bandwidth and a wide internal bus width.

Another aspect of the present invention is to provide a unified SRAM cache system incorporating several SRAM macros of an eDRAM system, where the incorporated SRAM macros share a single set of support circuits without compromising the performance of the eDRAM system.

Accordingly, a unified SRAM cache system is provided incorporated several SRAM macros of an eDRAM system and their functions. Each incorporated SRAM macro can be independently accessed without interfering with the other incorporated SRAM macros within the unified SRAM cache system. The incorporated SRAM macros share a single set of support circuits, such as row decoders, bank decoders, sense amplifiers, wordline drivers, bank pre-decoders, row pre-decoders, I/O drivers, multiplexer switch circuits, and data buses, without compromising the performance of the eDRAM system.

DETAILED DESCRIPTION OF THE INVENTION

The present invention provides a unified SRAM cache system for an embedded DRAM (eDRAM) having a micro-cell architecture, a wide data bandwidth and wide internal bus width. A description will now be given as to the operation of an embedded DRAM macro. In order to save chip area, the purpose of this description is to illustrate that the unified SRAM cache system of the present invention can be used to replace several SRAM macros without jeopardizing the eDRAM operation.

Figure 1:
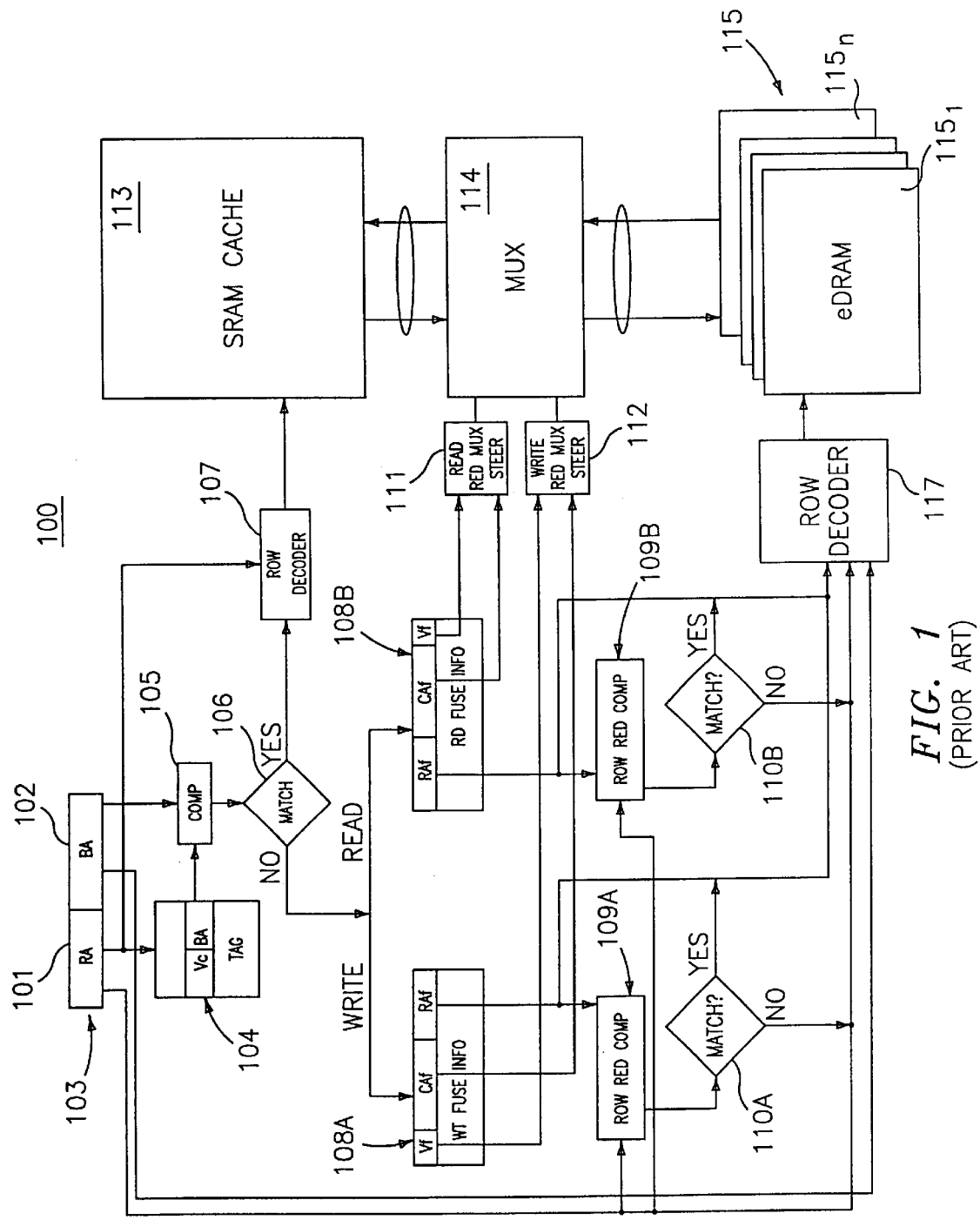
FIG. 1 is a flow chart-type block diagram of a prior art eDRAM system having a micro-cell architecture.

With reference to FIG. 1, there is shown a block diagram of a prior art high-speed eDRAM macro system having a micro-cell architecture designated generally by reference numeral 100. When an incoming address 103 is received from a CPU or memory controller, it contains a row address field (RA) 101 and a bank address field (BA) 102. The row address field 101 is used to decode a TAG block cache 104 to find out whether the data is currently stored in an SRAM cache 113. If the valid bit Vc of the decoded row of the TAG block cache 104 is "low", the data is not currently stored in the SRAM cache 113.

If the valid bit Vc of the decoded row of the TAG block cache 104 is "high", but the bank address stored in the TAG block cache 104 does not match the bank address from the incoming address 103 via a comparison operation by comparator 105 and a match operation 106, it also means that the data is not currently stored in the SRAM cache 113. The next step is then to get the data from the eDRAMs $115_1$–$115_n$ as described below. However, if the two addresses match, the row address of the incoming address 103 is used to access the SRAM cache 113 via a row decoder 107.

In order to access an eDRAM 115, the incoming bank address field 102 is used to decode a fuse SRAM cache or fuse register array. Depending on whether it is a write or read operation, two identical fuse SRAMs caches 108A, 108B are provided to facilitate read/write operation. From write fuse information SRAM cache 108A, the fuse valid bit Vf, fuse column address CAf and fuse row address RAf are retrieved all together. If the fuse valid bit Vf, also referred to as the master fuse bit, is "low", it means no fuse element is used in a particular eDRAM bank, and therefore the incoming address 103 can be used to directly decode the eDRAM macro 115 having the particular eDRAM bank.

On the other hand, if the fuse valid bit Vf is "high", the stored fuse column address CAf, or the redundancy column address, are used to steer 111 or 112 a column multiplexer (MUX) 114 to select the redundancy column element of the particular eDRAM bank of the particular eDRAM macro 115. In the mean time, the row address of the incoming address 103 is compared with the fuse row address RAf via a comparator 109A or 109B depending on whether it is a write or read operation. If the two row addresses match 110A or 110B, then the row redundancy is used so that a fuse row address is generated (not shown) to allow a redundant row of the particular eDRAM bank to be accessed via row decoder 117. If the two row addresses do not match, the incoming row address is used to decode the particular eDRAM bank using the row decoder 117. Identical operation are performed using read fuse information SRAM cache 108B in the case of a read operation.

The present invention is designed by observing from the operations described above with reference to FIG. 1 that in order to provide a smooth simultaneous read and write operation, it is efficient to use the dual-port SRAM cache 113, the dual-port fuse information SRAM 108A, 108B, and the dual-port TAG block cache 104. The SRAM cache 113 and TAG block cache 104 have the same word dimension, or the same width of the row address, for example 1024 wordlines. Also, during read or write, the identical wordline is accessed for the SRAM cache 113 and for the TAG block cache 104. For example, the row address of the incoming address 103 for TAG block cache 104 is the same row address for the SRAM cache 113, if the bank address of the incoming address 103 matches to the bank address in the TAG block cache 104.

Therefore, if a unified dual-port SRAM cache is provided, the TAG block cache 104 and SRAM cache 113 can be located side-by-side. During accessing of the TAG block cache 104, a wordline of the unified SRAM cache is activated, and if the two bank addresses match, i.e., the bank address of the incoming address 103 and the bank address in the TAG block cache 104, then the same activated wordline is used to get data from the SRAM cache and the TAG block cache within the same clock cycle. This can be a very fast operation.

The SRAM cache 113, the fuse information caches 108A, 108B, and test program code cache (not shown) are never accessed simultaneously. That is, only when the bank address of the incoming address 103 and the bank address of the TAG block cache 104 do not match are the fuse information caches 108A, 108B accessed. Also, only during the test mode are test programs stored in the test program code cache needed. Therefore, the SRAM cache 113, the fuse information caches 108A, 108B, and test program cache are mutually exclusive. Accordingly, they can share the same set of bitlines during the same clock cycle.

On the other hand, the SRAM cache 113 and TAG block cache 104, or the fuse information caches 108A, 108B and test programs cache, can be accessed simultaneously. Therefore, they cannot share the same set of bitlines, but as indicated above can share the same set of wordlines.

Figure 2:
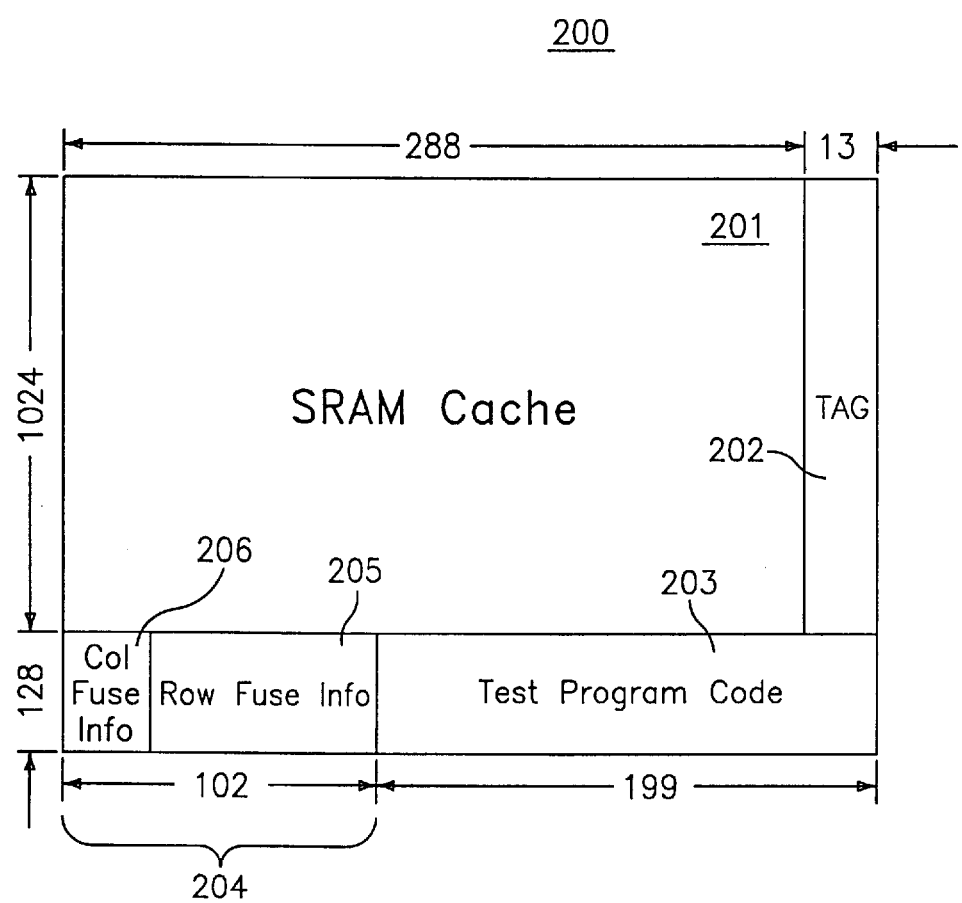
FIG. 2 is a block diagram of a unified SRAM cache system according to the present invention.

FIG. 2 is a block diagram of an exemplary unified SRAM cache system according to the present invention designated generally by reference numeral 200. The unified SRAM cache system includes an SRAM cache 201; a TAG block cache 202 located adjacent to the SRAM cache 201 for sharing the same wordlines with the SRAM cache 201; a test program code cache 203; and a dual-port fuse information cache 204 (one port for write operations and one port for read operations) having a row fuse information cache 205 and a column fuse information cache 206. The test program code cache 203 and the dual-port fuse information cache 204 share the same set of bitlines with the SRAM cache 201. Accordingly, during the same clock cycle the SRAM cache 201, the test program code cache 203, and the dual-port fuse information cache 204 can be simultaneously accessed.

The dual-port fuse information cache 204 can be used for redundancy allocation during the test mode and for storing fuse information during a redundancy test. That is, the fuse information cache 204 is configured for allocating redundant elements during the test mode and for storing fuse information during the redundancy test. During the test mode, the fuse information is streamed out from the fuse information cache 204 to hard program the fuse elements in case the fuse elements are determined to be faulty or defective.

When the test mode is over, the fuse information cache 204 is used to store the fuse information after each power-on for performing eDRAM read and write operations. The stored fuse information is accessible by the eDRAM system during a non-test mode, e.g., during the execution of read and write operations, for selecting available redundant elements as indicated by the stored fuse information to replace defective elements to direct data to and from the eDRAM array 115.

The test program code cache 203, the row fuse information cache 205, and the column fuse information cache 206 are located adjacent to each other for sharing the same wordlines. The SRAM cache 201 of FIG. 2 has 1024 wordlines and 288 pairs of bitlines; the TAG block cache 202 has 1024 wordlines and 13 pairs of bitlines; the test program code cache 203 has 128 wordlines and 199 pairs of bitlines for storing at least one test program; and the dual-port fuse information cache 204 has 128 wordlines and a 102 pairs of bitlines.

Figure 3:
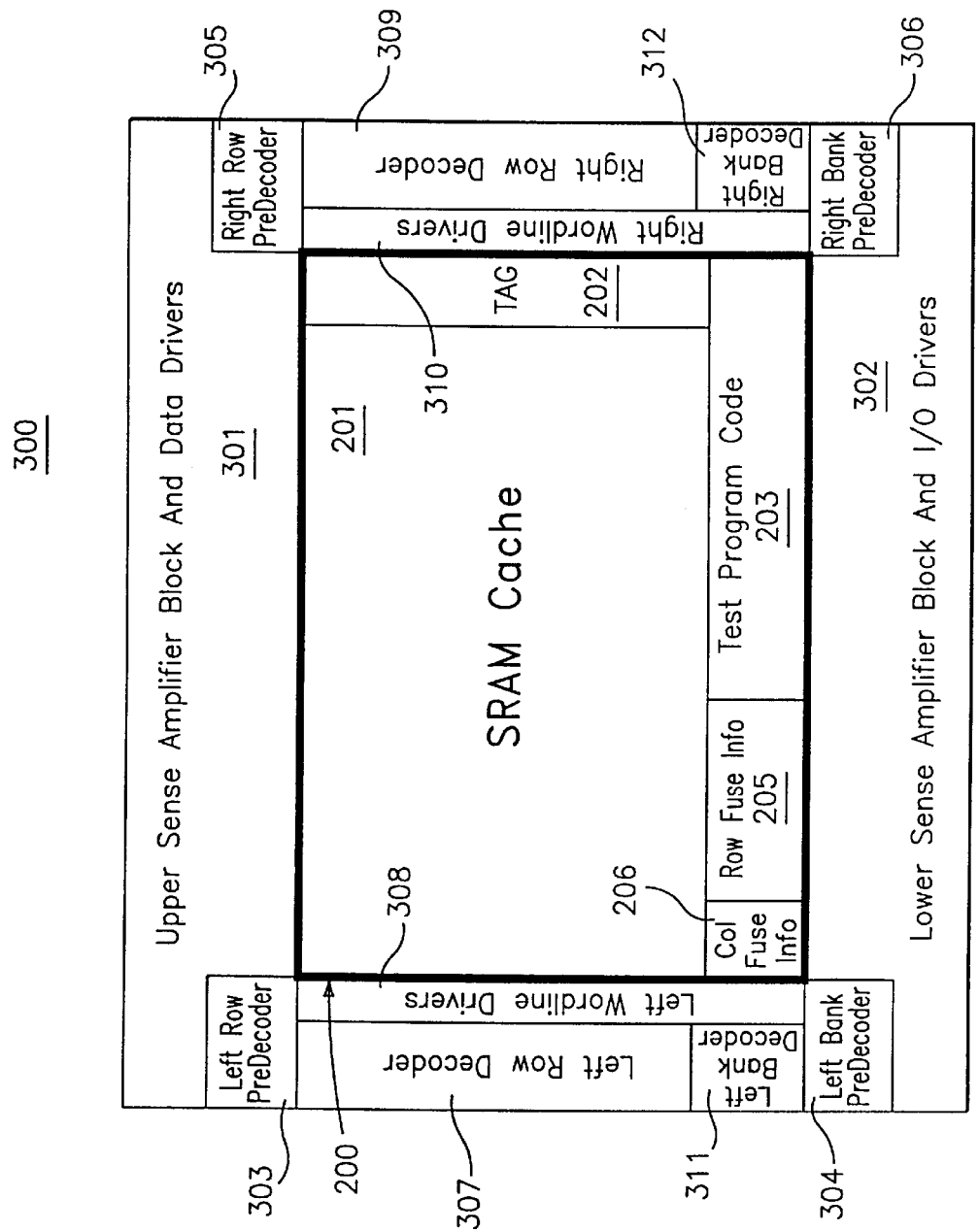
FIG. 3 is a block diagram of the unified SRAM cache system of FIG. 2, and its support circuits according to the present invention.

FIG. 3 is a block diagram of the unified SRAM cache system 200, and its support circuits designated generally by reference numeral 300. In order to accommodate dual-port operation, upper and lower sense amplifier blocks 301, 302 having I/O drivers, left and right row decoders 307, 309, and left and right wordline drivers 308, 310 are provided. The left and right row decoders 307, 309 are simultaneously used for selecting two wordlines; one wordline for read operation and one wordline for write operation, where both operations are performed within each clock cycle.

Further, on the top and bottom of the left row decoder 307 and left wordline driver 308 are provided a left row pre-decoder 303 and a left bank pre-decoder 304. On the top and bottom of the right row decoder 309 and right wordline driver 310 are provided a right row pre-decoder 305 and a right bank pre-decoder 306. Further still, left and right bank decoders 311, 312 are provided within the left and right row decoders 307, 309 as known in the art.

The function of the left and right row pre-decoders 303, 309 and the left and right bank pre-decoders 304, 306 is to perform two-stage decoding, since, in the eDRAM microcell architecture, the number of banks is in the range from 64 to 512 and the number of wordlines per bank is also in the range of 64 to 512. The left and right bank pre-decoders 304, 306 select a particular bank and the left and right row pre-decoders 303, 309 select a particular wordline.

In the exemplary unified SRAM cache system 200 of the present invention, the left side is for read operations, where the data is read out from the upper sense amplifier block 301, and the right side is for both read and write operations, where the data can be either read or written via the lower sense amplifier block 302.

Figure 4:
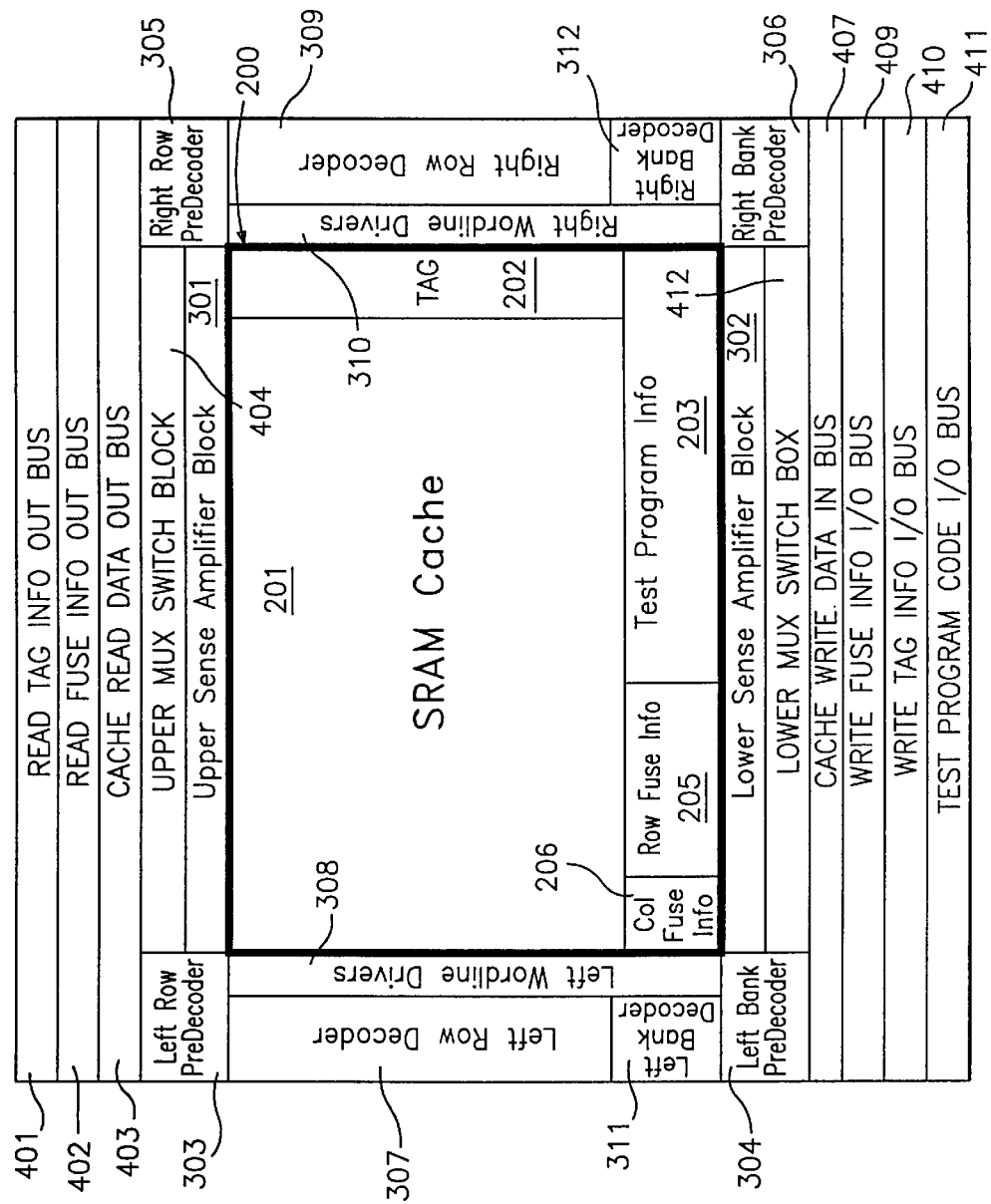
FIG. 4 is a block diagram of the unified SRAM cache system of FIG. 2, its support circuits and buses according to the present invention.

FIG. 4 is a block diagram of the unified SRAM cache system 200, its support circuits as shown by FIG. 3 and buses designated generally by reference numeral 400. On the upper portion of the unified SRAM cache system 200, there are three buses, i.e., the read TAG information out bus 401, the read fuse information out bus 402, and the cache read data out bus 403. An upper mux switch block 404 connects the upper sense amplifier block 301 with the buses 401, 402, 403. The operation of the upper mux switch block 404 is described below with reference to FIG. 5.

During a read operation, the TAG block cache 202 is accessed via TAG information out bus 401; the dual-port fuse information cache 204 is accessed via read fuse information out bus 402; and the SRAM cache 201 is accessed via cache read data out bus 403.

On the lower portion of the unified SRAM cache system 200, there are four buses, i.e., the cache write data in bus 407, the write fuse information I/O bus 409, the write TAG information I/O bus 410, and the test program code I/O bus 411. The buses 409, 410, 411 are I/O buses. Therefore, these buses can input data (i.e., for write operations) and output data (i.e., for read operations) to and from the SRAM cache system 200. Since the write ports to the SRAM cache system 200 are provided via the lower sense amplifier block 302, all incoming data are written to the SRAM cache 201, the TAG block cache 202, the test program code cache 203 and the dual-port fuse information cache 204 via the lower sense amplifier block 302.

A lower mux switch block 412 connects the lower sense amplifier block 302 with the buses 407, 409, 410, 411. The operation of the lower mux switch block 412 is described below with reference to FIG. 6.

During a write or read operation, the SRAM cache 201 is accessed via cache write data in bus 407; the dual-port fuse information cache 204 is accessed via write fuse information I/O bus 409; the TAG block cache 202 is accessed via write TAG information I/O bus 410; and the test program code cache 203 is accessed via test program code I/O bus 411.

Figure 5:
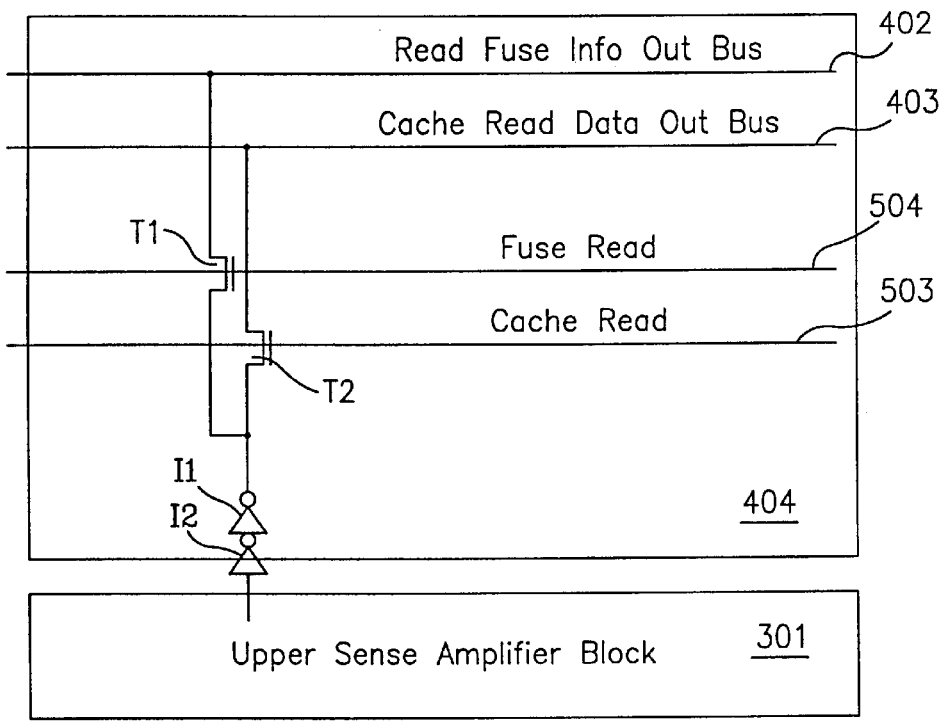
FIG. 5 is a block diagram of an upper mux switch block for switching to one of several buses for transferring data from the unified SRAM cache system according to the present invention.

FIG. 5 is a block diagram of the upper mux switch block 404 for switching to one of several buses for transferring data from the unified SRAM cache system 200 according to the present invention. Data read from the unified SRAM cache system 200 is steered to the corresponding bus by the upper mux switch block 404.

For example, a signal developed along a read data line from the SRAM cache 201, where the data line is shared by the fuse information cache 204, is amplified by the upper sense amplifier block 301 and driven out via a buffer formed by two inverters I1, I2 to the cache read data out bus 403. To accomplish this, a cache read control signal 503 is transmitted from a processing unit, such as a CPU, to turn on switch or transistor T2 to steer the data to the cache read data out bus 403. Similarly, if fuse data are being retrieved, then a fuse read control signal 504 is transmitted from the processing unit to turn on switch or transistor T1 to steer the data to the read fuse information out bus 402.

The fuse data stored within the dual-port fuse information cache 204 and the data stored within the SRAM cache 201 are accessed at different clock cycles. Only when an SRAM cache miss is detected, i.e., when comparison and match operations similar to 105, 106 of FIG. 1 determine that a bank address of an incoming address is different from a bank address stored in the TAG block cache 202, is the dual-port fuse information cache 204 accessed to get eDRAM redundancy information.

Figure 6:
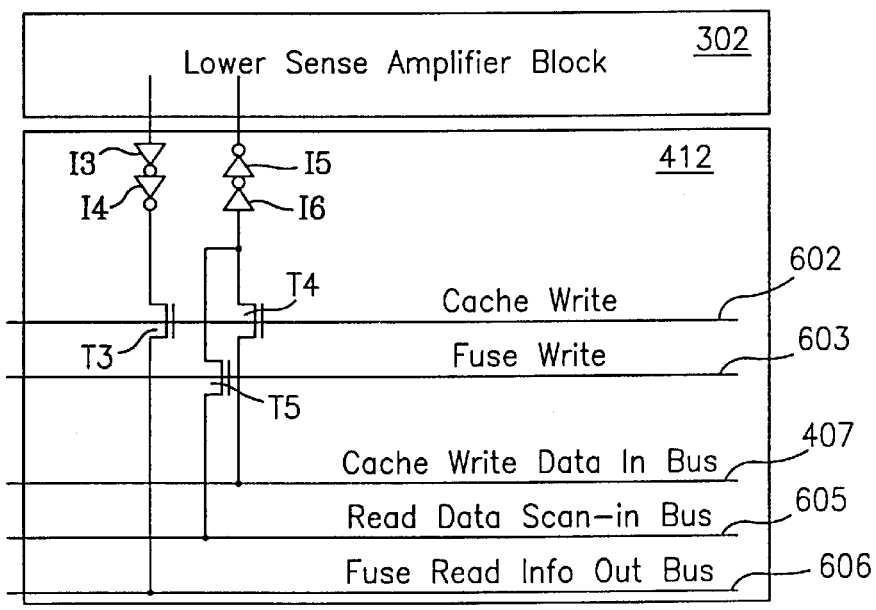
FIG. 6 is a block diagram of a lower mux switch block for switching to one of several buses for transferring data from and to the unified SRAM cache system according to the present invention.

FIG. 6 is a block diagram of the lower mux switching block 412 for switching to one of several buses for transferring data from and to the unified SRAM cache system 200 according to the present invention. The incoming SRAM cache data (i.e., data to be stored in the SRAM cache 201) or fuse information cache data (i.e., data to be stored in the dual-port fuse information cache 204) are fed via a buffer formed by two inverters I5, I6. eDRAM data which are to be written to the SRAM cache 201 are transmitted to the SRAM cache 201 via the cache data write in bus 407. To transmit the data from the eDRAM to the SRAM cache 201, a cache write control signal 602 is transmitted from the processing unit to turn on switch or transistor T4 to steer the data to the cache data write in bus 407.

Similarly, if fuse data are to be written to or scanned into the dual-port fuse information cache 204, then a fuse write control signal 603 is transmitted from a BIST, or an on-chip built-in self-test unit, to turn on switch or transistor T5 to steer the data to a fuse data scan-in bus 605 of the write fuse information I/O bus 409. The fuse write control signal 603 is transmitted during a power-on period, or after voltage levels of the chip have been established, from the BIST to perform fuse information scanning to transfer fuse information from a fuse bank to the dual-port fuse info cache 204, since it is closer to the eDRAM 115.

Outgoing data from the unified SRAM cache system 200 is retrieved via the lower sense amplifier block 302 and steered through a buffer formed by two inverters 13, 14. Only when a SRAM cache miss occurs as described above during a read operation are data stored within the dual-port fuse information cache 204 read out via a fuse read information out bus 606 of the write fuse information I/O bus 409. This is accomplished by transmitting the cache write control signal 602 to turn on switch or transistor T3 to steer the data to the fuse read information out bus 606.

Figure 7:
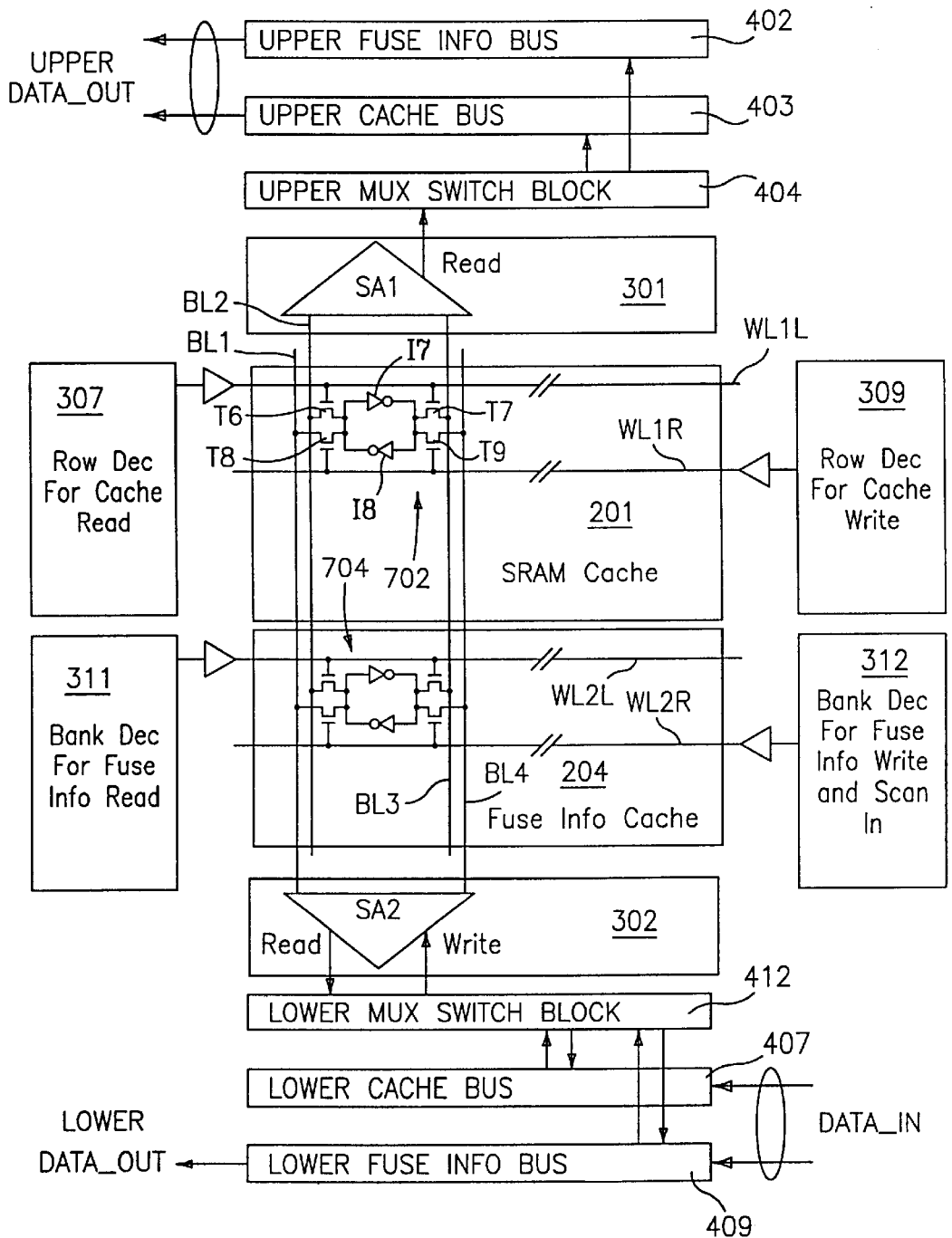
FIG. 7 shows a simplified schematic diagram illustrating the operation of the unified dual-port SRAM cache system according to the present invention.

With reference to FIG. 7 there is shown a simplified schematic diagram illustrating the operation of the unified dual-port SRAM cache system 200. The SRAM cache 201 and the dual-port fuse information cache 204 share the same set of bitlines BL1–4. Two cells 702, 704 are illustrated for simplicity purposes.

The first cell 702 is located in the SRAM cache 201 and has four transistors T6–T9 and a latch formed by two back-to-back inverts I7, I8. The first pair of transistors T6, T7 are used to connect the cell 702 via bitlines BL2, BL3 to a sense amplifier SA1 of the upper sense amplifier block 301 to serve as the first port for read only operations. The second pair of transistors T8, T9 are used to connect the cell 702 via bitlines BL1, BL4 to a sense amplifier SA2 of the lower sense amplifier block 302 to serve as the second port for write and read operations. A pair of wordlines WL1L, WL1R are used to connect the cell 702 via transistors T6, T7 to the left row decoder 307 and via transistors T8, T9 to the right row decoder 309, respectively.

The first port is accessed via the right row decoder 309, while the second port, if necessary, is accessed via the left row decoder 307. Similarly, a first port of the cell 704 is accessed via the left bank decoder 311 via wordline WL2L and a second port of the cell 704, if necessary, is accessed via the right bank decoder 312 via wordline WL2R. Accordingly, the SRAM cache 201 and the fuse info cache 203, or any other non-SRAM cache, form either a single-port or a dual-port unified cache memory.

Also shown in FIG. 7 are the upper and lower mux switch block 404, 412 and corresponding buses 403, 404 for outputting data UPPER DATA_OUT and 407, 409 for inputting/outputting data DATA_IN/LOWER DATA_OUT.

With the unified SRAM cache system 200 of the present invention, all the high-speed SRAM macros in an eDRAM system are consolidated thereby significantly reducing the chip area. Further, the performance of the eDRAM system is significantly improved, since data paths between eDRAM blocks are reduced. Further still, there is a reduction in the amount of power consumed due to shared hardware, e.g., a sharing of row decoders, bank decoders, sense amplifiers, etc., among the various SRAM macros in the unified SRAM cache system 200.

What has been described herein is merely illustrative of the application of the principles of the present invention. For example, the systems described above and implemented as the best mode for operating the present invention are for illustration purposes only. As a particular example, for instance, other design configurations may be used for the unified SRAM cache system which provide similar operation as the system described herein. In other words, other arrangements and methods may be implemented by those skilled in the art without departing from the scope and spirit of this invention.

We claim:

1. A unified SRAM cache system for storing SRAM cache data and non-SRAM cache data for an embedded DRAM (eDRAM) system, the unified SRAM cache system comprising:

an SRAM cache for storing SRAM cache data; and at least one non-SRAM cache for storing non-SRAM cache data, wherein the SRAM cache and the at least one non-SRAM cache are configured for sharing one of a set of bitlines and a set of wordlines.

2. The system according to claim 1, wherein the SRAM cache and the at least one non-SRAM cache share at least one external circuit for one of reading and writing data from and to the SRAM cache and the at least one non-SRAM cache.

3. The system according to claim 2, wherein the at least one external circuit is selected from the group consisting of a sense amplifier, a row decoder, a bank decoder, a wordline driver, a bank pre-decoder, a row pre-decoder, an I/O driver, a multiplexer switch circuit, and a data bus.

4. The system according to claim 1, wherein the at least one non-SRAM cache is selected from the group consisting of a TAG block cache, a test program code cache, and a fuse information cache having a column fuse information cache and a row fuse information cache.

5. The system according to claim 3, wherein the multiplexer switch circuit is connected to the sense amplifier circuit for one of reading data stored within the SRAM cache and the at least one non-SRAM cache, and writing data to the SRAM cache and the at least one non-SRAM cache.

6. The system according to claim 3, wherein the multiplexer switch circuit is connected to at least two buses and includes at least two switches for switching between the at least two buses, wherein the at least two switches are controlled by at least two control signals.

7. The system according to claim 6, wherein a first control signal of the at least two control signals includes a fuse read control signal for controlling a first switch of the at least two switches for reading fuse data stored within the at least one non-SRAM cache, and wherein a second control signal of the at least two control signals includes a cache read control signal for controlling a second switch of the at least two switches for reading data stored within the SRAM cache.

8. The system according to claim 6, wherein a first control signal of the at least two control signals includes a fuse write control signal for controlling a first switch of the at least two switches for writing fuse data to the at least one non-SRAM cache, and wherein a second control signal of the at least two control signals includes a cache write control signal for controlling one of a second and a third switch of the at least two switches for one of writing data to the SRAM cache and reading fuse data stored within the at least one non-SRAM cache.

9. The system according to claim 1, wherein the SRAM cache is configured for sharing the set of wordlines with a TAG block cache of the at least one non-SRAM cache.

10. The system according to claim 1, wherein the SRAM cache is configured for sharing the set of bitlines with a fuse information cache of the at least one non-SRAM cache.

11. The system according to claim 10, wherein the fuse information cache is configured for allocating redundant elements during a test mode, for storing fuse information during a redundancy test, and for being accessible by the eDRAM system for selecting available redundant elements as indicated by the stored fuse information to replace defective elements.

12. The system according to claim 1, wherein the SRAM cache is configured for sharing the set of bitlines with a test program code cache of the at least one non-SRAM cache.

13. The system according to claim 1, wherein the SRAM cache and the at least one non-SRAM cache form one of a single-port and a dual-port unified cache memory.

14. A unified SRAM cache system for storing SRAM cache data and non-SRAM cache data for an embedded DRAM (eDRAM) system, the unified SRAM cache system comprising:
an SRAM cache for storing SRAM cache data; and
at least one non-SRAM cache for storing non-SRAM cache data, wherein the SRAM cache and the at least one non-SRAM cache are configured for sharing at least one external circuit for one of reading and writing data from and to the SRAM cache and the at least one non-SRAM cache,
wherein the SRAM cache and the at least one non-SRAM cache share one of a set of bitlines and a set of wordlines.

15. The system according to claim 14, wherein the at least one external circuit is selected from the group consisting of a sense amplifier, a row decoder, a bank decoder, a wordline driver, a bank pre-decoder, a row pre-decoder, an I/O driver, a multiplexer switch circuit, and a data bus.

16. The system according to claim 14, wherein the at least one non-SRAM cache is selected from the group consisting of a TAG block cache, a test program code cache, and a fuse information cache having a column fuse information cache and a row fuse information cache.

17. The system according to claim 15, wherein the multiplexer switch circuit is connected to the sense amplifier circuit for one of reading data stored within the SRAM cache and the at least one non-SRAM cache, and writing data to the SRAM cache and the at least one non-SRAM cache.

18. The system according to claim 15, wherein the multiplexer switch circuit is connected to at least two buses and includes at least two switches for switching between the at least two buses, wherein the at least two switches are controlled by at least two control signals.

19. The system according to claim 18, wherein a first control signal of the at least two control signals includes a fuse read control signal for controlling a first switch of the at least two switches for reading fuse data stored within the at least one non-S RAM cache, and wherein a second control signal of the at least two control signals includes a cache read control signal for controlling a second switch of the at least two switches for reading data stored within the SRAM cache.

20. The system according to claim 18, wherein a first control signal of the at least two control signals includes a fuse write control signal for controlling a first switch of the at least two switches for writing fuse data to the at least one non-SRAM cache, and wherein a second control signal of the at least two control signals includes a cache write control signal for controlling one of a second and a third switch of the at least two switches for one of writing data to the SRAM cache and reading fuse data stored within the at least one non-SRAM cache.

21. The system according to claim 14, wherein the SRAM cache is configured for sharing the set of wordlines with a TAG block cache of the at least one non-SRAIVI cache.

22. The system according to claim 1, wherein the SRAM cache is configured for sharing the set of bitlines with a fuse information cache of the at least one non-SRAM cache.

23. The system according to claim 22, wherein the fuse information cache is configured for allocating redundant elements during a test mode, for storing fuse information during a redundancy test, and for being accessible by the eDRAM system for selecting available redundant elements as indicated by the stored fuse information to replace defective elements.

24. The system according to claim 14, wherein the SRAM cache and the at least one non-SRAM cache form one of a single-port and a dual-port unified cache memory.

25. The system according to claim 14, wherein the SRAM cache is configured for sharing the set of bitlines with a test program code cache of the at least one non-SRAM cache.

26. A unified SRAM cache system for storing SRAM cache data and non-SRA1S4 cache data for an embedded DRAM (eDRAM) system, the unified SRAM cache system comprising:
an SRAM cache for storing SRAM cache data; and
at least one non-SRAM cache for storing non-SRAM cache data, wherein the SRAM cache and the at least one non-SRAM cache form one of a single-port and a dual-port unified cache memory,
wherein the SRAM cache and the at least one non-SRAM cache share one of a set of bitlines and a set of wordlines.

27. The system according to claim 26, wherein the at least one non-SRAM cache is selected from the group consisting of a TAG block cache, a test program code cache, and a fuse information cache having a column fuse information cache and a row fuse information cache.

28. The system according to claim 26 wherein the SRAM cache is configured for sharing the set of wordlines with a TAG block cache of the at least one non-SRAM cache.

29. The system according to claim 26, wherein the SRAM cache is configured for sharing the set of bitlines with a fuse information cache of the at least one non-SRAM cache.

30. The system according to claim 27, wherein the fuse information cache is configured for allocating redundant elements during a test mode, for storing fuse information during a redundancy test, and for being accessible by the eDRAM system for selecting available redundant elements as indicated by the stored fuse information to replace defective elements.

31. The system according to claim 26, wherein the SRAM cache and the at least one non-SRAM cache are configured for sharing at least one external circuit for one of reading and writing data from and to the SRAM cache and the at least one non-SRAM cache.

32. The system according to claim 31, wherein the at least one external circuit is selected from the group consisting of a sense amplifier, a row decoder, a bank decoder, a wordline driver, a bank pre-decoder, a row pre-decoder, an I/O driver, a multiplexer switch circuit, and a data bus.

33. The system according to claim 32, wherein the multiplexer switch circuit is connected to the sense amplifier circuit for one of reading data stored within the SRAM cache and the at least one non-SRAM cache, and writing data to the SRAM cache and the at least one non-SRAM cache.

34. The system according to claim 32, wherein the multiplexer switch circuit is connected to at least two buses and includes at least two switches for switching between the at least two buses, wherein the at least two switches are controlled by at least two control signals.

35. The system according to claim 34, wherein a first control signal of the at least two control signals includes a fuse read control signal for controlling a first switch of the at least two switches for reading fuse data stored within the at least one non-SRAM cache, and wherein a second control signal of the at least two control signals includes a cache read control signal for controlling a second switch of the at least two switches for reading data stored within the SRAM cache.

36. The system according to claim 34, wherein a first control signal of the at least two control signals includes a fuse write control signal for controlling a first switch of the at least two switches for writing fuse data to the at least one non-SRAJVJ cache, and wherein a second control signal of the at least two control signals includes a cache write control signal for controlling one of a second and a third switch of the at least two switches for one of writing data to the SRAM cache and reading fuse data stored within the at least one non-SRAM cache.

37. The system according to claim 26, wherein the SRAM cache is configured for sharing the set of bitlines with a test program code cache of the at least one non-SRAM cache.

38. A method of controlling operation of a unified SRAIVI cache system configured for storing SRAM cache data within an SRAM cache and non-SRAM cache data within at least one non-SRAM cache, the method comprising the steps of:

activating a wordline of a set of wordlines during a first time period to access the SRAM cache; and activating the wordline of the set of wordlines during a second time period to access the at least one non-SRAM cache, wherein the first time period and the second time period do not overlap.

39. The method according to claim 38, further comprising the step of activating another wordline of the set of wordlines during the first time period to access one of a fuse information cache and a test program code cache of the at least one non-SRAM cache.

40. The method according to claim 38, wherein the step of activating the wordline of the set of wordlines during the second time period to access the at least one non-SRAM cache includes the step of activating the wordline of the set of wordlines during the second time period to access a TAG block cache of the at least one non-SRAM cache.

41. The method according to claim 38, further comprising the step of activating a bitline of a set of bitlines during a third time period to access one of the SRAM cache and a first or second non-SRAM cache of the at least one non-SRAM cache.

42. The method according to claim 41, further comprising the step of activating another bitline of the set of bitlines during the third time period to access a TAG block cache of the at least one non-SRAM cache.

* * * * *

UNITED STATES PATENT AND TRADEMARK OFFICE
CERTIFICATE OF CORRECTION

PATENT NO. : 6,876,557 B2
DATED : April 5, 2005
INVENTOR(S) : Louis L. Hsu et al.

It is certified that error appears in the above-identified patent and that said Letters Patent is hereby corrected as shown below:

Column 11,
Line 12, "non-SRAJVJ" should be -- non-SRAM --.

Signed and Sealed this

Sixth Day of September, 2005

JON W. DUDAS
*Director of the United States Patent and Trademark Office*